United States Patent [19]

Ricci et al.

[11] Patent Number: 5,164,433
[45] Date of Patent: Nov. 17, 1992

[54] RHEOLOGICAL AGENTS AND THICKENERS

[75] Inventors: Anthony P. Ricci, Jackson; Alfred J. Whitton, Point Pleasant; Hemi N. Nae, Princeton, all of N.J.

[73] Assignee: Rheox, Inc., Hightstown, N.J.

[21] Appl. No.: 686,473

[22] Filed: Apr. 17, 1991

[51] Int. Cl.⁵ .......................... C08L 3/00; C08K 3/34; C08K 3/20
[52] U.S. Cl. ..................................... 524/47; 524/445; 524/446; 524/447
[58] Field of Search ................. 524/47, 445, 446, 447

[56] References Cited

U.S. PATENT DOCUMENTS

| | | | |
|---|---|---|---|
| 4,287,103 | 9/1981 | Francis et al. | 524/47 |
| 4,657,943 | 4/1987 | Wietsma | 523/216 |
| 4,808,324 | 2/1989 | Périard et al. | 252/23 |
| 4,808,442 | 2/1989 | Verlaan et al. | 524/445 |

*Primary Examiner*—Nathan M. Nutter
*Attorney, Agent, or Firm*—Evenson, Wands, Edwards, Lenahan & McKeown

[57] ABSTRACT

A rheological agent and thickener composition for aqueous systems, comprising a mixture of clay, such as hectorite, a synthetic polymer and a starch-type material. The mixture provides efficient thickening, sag resistance, spatter resistance and stability in water-based systems, particularly in latex-based coatings.

27 Claims, No Drawings

RHEOLOGICAL AGENTS AND THICKENERS

BACKGROUND AND SUMMARY OF THE INVENTION

The present invention relates to thickener compositions useful for thickening aqueous systems such as latex paints, and, more particularly, to rheological agents and thickeners for aqueous systems in the form of a mixture of clay, polymeric particles and starch-type materials which provides superior thickening efficiency, roller spatter resistance characteristics, and improved flow properties at substantially lower costs than with currently available thickeners.

Rheological additives are substances which, when added to a system, change the system's rheological properties such as flow, viscosity, leveling, sag resistance, settling and the like. These additives include rheology modifiers, viscosity modifiers, viscosifiers, thickeners, gellants, thixotropes, anti-sag agents, anti-setting agents, suspending agents, emulsifiers, thinners and surfactants.

Commercial thickeners for latex paints available today are mostly cellulosics which thicken the water carrier of the paints. Such thickeners are relatively expensive and, at the same time, do not provide the necessary rheology to achieve better roller spatter resistance and flow properties.

Aqueous compositions which generally employ thickeners include paints and other coating compositions such as coatings for paper, inks, and the like. Most of these aqueous compositions require the use of a thickening material to improve rheological properties such as to obtain a proper viscosity in order to maintain pigments, binders and other solids dispersed, suspended or emulsified therein, to obtain suitable flow properties, and to obtain good compatibility.

Among the well known rheological additives are clays, organoclays, fumed silica, organic and polymeric thickeners. These rheological additives are described in Van der Watt and Godman in *Clay and Clay Materials*, Volume 9, pate 568 (1960) and McCormick, Gok and Schulz, in *Encyclopedia or Polymer Science and Engineering*, Volume 17, page 730 (1989).

Clay minerals are a group of minerals essentially composed of hydrated aluminum silicates. Among these are montmorillonite, kaolin, illite, saponite, bentonite, hectorite, beidellite, stevensite, attapulgite and sepiolite. These minerals are described in *Applied Clay Mineralogy*, R. E. Grim, McGraw Hill, NY (1962). One important type of clay mineral is hectorite, which is obtained from various deposits. Hectorite deposits typically contain about 50% hectorite by weight, the other components being mainly calcite and dolomite and sometimes feldspar. The hectorite deposit is usually beneficiated by removing the impurities, for example, by preparing a water slurry, centrifugation, separation of the purified clay and drying the clay by various drying methods such as drum drying, oven drying or spray drying.

Among the polymeric rheological additives are guar gum, tragacanth gum, pectin, xanthan and alginate, which are natural thickeners, hydroxyethylcellulose and methyl cellulose, which are modified cellulosics and synthetic polymers or copolymers of ethylenically unsaturated carboxylic acids and their ester derivatives, such as poly (acrylic acid), poly acrylamide and maleic anhydridestyrene copolymers. Such thickeners are described, for example, in U.S. Pat. No. 4,507,426. U.S. Pat. No. 3,769,257 describes the use of cellulosic ethers in latex based paints. U.S. Pat. No. 4,558,079 describes the use of hydrophobically modified cellulosic materials as a thickener for joint compounds which are used in the construction of walls and ceilings. U.S. Pat. No. 4,226,754 describes a synthetic copolymer which is the reaction product of methacrylic acid, methyl methacrylate and vinyl acetate and its use as a thickener for water based coatings. Another type of synthetic thickeners is based on hydrophobically capping a water soluble polymer. For example, U.S. Pat. No. 3,770,684 describes a thickener based on a water soluble polyether capped with insoluble hydrocarbon residues and their use in latex paint compositions. U.S. Pat. No. 4,079,028 describes polyurethane-based copolymers which have hydrophobic end groups connected by hydrophilic polyether groups.

Polymeric thickeners and clay minerals have been used in formulations for various products. For example, U.S. Pat. No. 4,657,943 describes a thickening agent useful in textile padding and oil drilling muds containing an acrylate polymer and an aluminum silicate, montmorillonite clay or bentonite which shows a synergistic effect in increasing the viscosity of the system under alkaline conditions. Thickeners are used in a host of products such as paints, varnishes, enamels, waxes, oil drilling fluids, inks, adhesives, sealants, cosmetics, paper coatings, textile backings, bath emulsion systems, cleaners and polishers and detergents.

An important use of thickeners is in latex paint compositions which are used extensively for coatings and decorations. It is desired that such coating systems will be flowing during their application, but that they do not sag after they have been applied. It is further desired that, while being applied, these coatings remain on the substrate and not spatter around the application area. It is still further desired that such coating systems will be stable at elevated temperatures and for a sufficient period of time, so that their properties do not change upon storage. The thickener may be added to the coating system either during the grinding stage or after the pigment has been dispersed, i.e. as a post-additive. Polysaccarides such as hydroxyethyl cellulose, have dominated the latex paint thickener market almost since the inception of latex paint. Hydroxyethyl cellulose is a nonionic water soluble material that thickens and stabilizes many water-based paint systems. Hydroxyethyl cellulose, however, suffers from some disadvantages. For example, hydroxyethyl cellulose is costly, is subject to enzyme degradation and produces poor spatter resistance. Hydroxyethyl cellulose thickeners are subject to bacterial and enzyme attack which results in loss of viscosity and other flow properties, and therefore require use of anti-biodegradation preservatives in paint. Furthermore, the thickeners swell rapidly in water to form lumps which are not readily dispersed. The proper addition of hydroxyethyl cellulose thickeners requires, therefore, careful and slow addition, resulting in long mixing and dilution times, thereby adding steps to the coatings preparation process, which in turn increase the coatings processing cost.

The search has therefore continued for a thickener which (1) can be employed as a post-additive, directly to aqueous compositions, particularly latex paint compositions, (2) is less biodegradable, and (3) yields a lower cost/performance ratio with respect to the overall manufacturing and rheological properties of a latex paint composition into which it is incorporated, such as in addition to thickening action, spattering resistance, leveling and when compared to cellulosic materials.

One solution to this problem has been the development of a synthetic polymers in the form of a reaction product of methacrylic acid, methyl methacrylate and vinyl acetate in the proportions specified in U.S. Pat. No. 4,226,754, the contents of which are specifically incorporated herein by reference. We have found, however, that thickener blends having higher concentrations of such synthetic polymers are both costly to use and often produce poor paint stability.

The synthetic polymers also require high concentrations to provide the required rheological properties. In many applications, the aqueous system containing the thickener is exposed to temperature in the range of 20° C. to 100° C. The increase in temperature causes generally a decrease in viscosity and stability of the aqueous composition.

Smectite-type clays such as montmorillonite, bentonite, beidellite, hectorite, saponite and stevensite and a process for producing organopilic clay gellants using these smectite-type clays are described more specifically in U.S. Pat. No. 4,742,098. Such clays, particularly hectorite, have been found useful in paints as thickeners as well as in polymeric thickeners, but to date these products have exhibited poor roller-splatter, poor efficiency characteristics or poor stability.

Attempts to improve the known rheological agents and thickeners by using blends of hectorite clay and polymeric particles have thus been unsuccessful in increasing stability, product efficiency, roller spatter resistance, easy dispersal and cost. For example, too much hectorite has been found to result in poor roller spatter resistance and low product efficiency, while too much polymeric material has been found costly and results in poor paint stability.

Thus, there has been and still is a need for a thickening composition which imparts increased viscosity, sag resistance, spatter resistance and heat stability to water based coatings systems. There is also a need for a low cost thickener which will be easy to utilize in various types of formulations, especially as a post additive, added directly to aqueous systems to impart these properties.

We have recognized that a third component in the claypolymer mixture will lower the ratio of polymeric particles to clay and thereby achieve a cost effective, yet stable rheological agent which is also superior to the two component product. We further recognized that such an additional component must be a starch or a starch derivative, including chemical modifications to the starch through esterification, ethoxylation and carboxylation.

Starch is the principal component of most seeds, tubers and roots and is produced commercially from corn, wheat, rice, tapioca, potato, sago and other sources. Starch is a mixture of linear (amylose) and branched (amylopectin) polysaccharides. It is used extensively in the paper, textile and adhesive industries. Starch may be modified by oxidation of the hydroxyl groups to give aldehydes, ketones or carboxylic acids. Other derivatives are produced by etherification, esterification and graft polymerization. Hydroxy propyl and other hydroxyalkyl starches are used as additives in salad dressing and other food thickening applications.

It is an object of the present invention, therefore, to provide a composition containing an aqueous starch thickener for latex paints which provides increased viscosity and improves roller spatter resistance while maintaining good paint stability.

It is still another object of the present invention to provide an aqueous starch thickener composition which is less expensive than cellulosic thickeners and yet achieves increased product efficiency, while being easily dispersed in the grind and/or as water gel solutions.

The foregoing objects have been achieved in accordance with the present invention by the use of a clay/polymeric particle/starch mixture as rheological agents and thickeners for aqueous systems such as latex paints and other latex systems.

The present invention is directed to a composition of matter in which the clay is smectite, including hectorite or spray-dried hectorite, which composition interacts with latex, pigments and the like to yield higher viscosity.

More specifically, the present invention relates to a thickener composition for water based systems comprising:

(i) a clay which includes smectite, montmorillonite, bentonite, hectorite, kaolin, illite, saponite, attapulgite, sepiolite and the like and mixtures thereof;
(ii) a starch which includes corn starch, wheat starch, rice starch, tapioca starch, potato starch, sago starch, yucca starch, barley starch and the like, derivatives thereof including modifications through esterification, ethoxylation, carboxylation, grafting and mixtures thereof;
(iii) a polymer or copolymer which is the polymerization product of ethylenically unsaturated carboxylic acid monomer, modified ethylenically unsaturated carboxylic acid monomer and/or vinyl or modified vinyl monomer such as vinyl acetate.

The composition of the present invention further utilizes polymeric particles and commercially-available LORAMA 3030 starch or another suitable starch such as corn, yucca, barley and potato starches and derivatives thereof, including modifications through esterification, ethoxylation and carboxylation.

The invention further relates to an aqueous coating system comprising latex, pigments, extenders and fillers and from about 0.05% to 15% thickener composition comprising a clay/starch/polymer composition.

The invention is also directed to a method for preparing the thickener composition and the coating system, comprising mixing the clay, the starch and the polymer to obtain a blend, and adding the blend either during the grinding step of the coating preparation or as a postadditive composition to the coating system.

DETAILED DESCRIPTION OF THE INVENTION

These and other objects, advantages and characteristics of the present invention will become more apparent from the following detailed description of presently preferred compositions.

We have discovered that a combination comprising of a clay, a starch and a polymer, provide thickening in water based systems and, particularly in water based latex paints. This combination also provides better heat stability and spatter resistance to such water based systems. A further advantage of this combination is its better atomizing upon spraying and its faster water release properties. This combination is also low in cost, both in raw materials and in processing cost.

The clay to be used in the thickener composition of the present invention may be hectorite, bentonite, montmorillonite, kaolin, illite, saponite, attapulgite, sepiolite and the like and mixtures thereof. The clay may be a clay deposit or a beneficiated clay and it may be dried in a variety of methods including oven drying, drum drying or spray drying. In a typical clay refining or beneficiating process, the clay deposit is first put into solution, then centrifuged, separated and dried. A grinding step may also be used to obtain particles of a particular size. Hectorite clay, in particular spray dried hectorite is used in a presently preferred embodiment of the invention.

The clay will be present in the thickener composition in an amount sufficient to provide the desired rheological properties when combined with the starch and the polymer. This amount typically can range from about 0.1 to about 99.9% by weight of the total thickener composition, but will preferably be about 10 to 90% or even more preferably 20 to 50%. The amount of the clay used will depend largely on the end use of the thickener. Considerations which will determine the amount of clay to be used involve the desired viscosity of the water based composition, its flow and leveling, and its sag resistance and spatter resistance, as well as its heat stability in any specific formulation.

The starch may be corn starch, wheat starch, rice starch, tapioca starch, potato starch, sago starch, yucca starch, barley starch and the like, derivatives thereof or modified starch, for example, through esterification, ethoxylation, carboxylation or grafting of various groups onto the starch. A corn starch such as the commercially available LORAMA 3030 starch is used in a preferred embodiment of the present invention. The starch will be present in the thickener composition in an amount sufficient to provide the desired rheological properties when combined with the clay and the polymer. This amount typically can range from about 0.1 to about 99.9% by weight of the total thickener composition, but will preferably be about 10 to 90% or even more preferably 20 to 50%. The amount of the starch used will depend largely on the end use of the thickener.

The polymer may be a polymer or copolymer which is the polymerization product of ethylenically unsaturated carboxylic acid monomer, modified ethylenically unsaturated carboxylic acid monomer and/or vinyl or modified vinyl monomer such as vinyl acetate. The polymer will be present in the thickener composition in an amount sufficient to provide the desired rheological properties when combined with the clay and the starch. This amount typically can range from about 0.1 to about 99.9% by weight of the total thickener composition, but will preferably be about 10 to 90% or even more preferably 20 to 50%. The amount of the polymer used will depend largely on the end use of the thickener.

The thickener composition of the present invention may be used as a rheological additive in water based systems including paints, varnishes, enamels, waxes, oil drilling fluids, inks, adhesives, sealants, cosmetics, paper coatings, textile backing, bath emulsion systems, cleaners and polishers, detergent, joint compounds and mortars as well as other compositions which desirably contain a thickener composition. The thickener of the present invention is employed in such an amount sufficient to obtain the desired rheological properties, such as high viscosity at low shear rates, high modulus of elasticity, control of sagging of the fluid system and prevention of settling and hard packing of pigments, extenders and fillers present in the total composition containing the thickener.

The thickener composition generally will be used in a water based system. The amount to be used typically will be about 0.05 to 14% of the total weight of the system. Preferably the thickener composition will be present in an amount of about 0.1 to 5% of the total weight of the system (including water). For example, aqueous dispersions, emulsions, suspensions, solutions, slurries and the like may be thickened by the thickener composition.

In one presently preferred embodiment, the thickener composition of the invention is used in a latex based paint. A latex based paint formulation typically contains pigments, latex, extenders, fillers, water and other additives. These additives may include plasticizers, surfactants, preservatives, antifreeze agents, antifoam agents, coalescing agents, solvents and pH modifiers and combinations thereof. The additives may be present in the coating system in an amount of about 0.1 to 50% of the weight of the coating system.

A typical pigment is, for example, titanium dioxide. Typical latex materials may be vinyl type polymers such as polyvinylacetate. Typical extenders and fillers are calcium carbonate, talc, calcium sulfate, silica and the like. Formulations of these paints are well known in the art. A typical latex based paint formulation is shown in Table 1.

TABLE 1

| Latex Paint Formulation | | | |
|---|---|---|---|
| Ingredient | Commercial Name | Description | Pounds |
| Water | | | 332.0 |
| Pigment | KRONOS 2101 | Titanium dioxide | 50.0 |
| Extenders | Optiwhite | Aluminum silicate | 200.0 |
| | Atomite | Calcium carbonate | 200.0 |
| Preservative | Nuosept C | Proprietary | 0.5 |
| Surfactants | Triton N-57 | Proprietary | 4.0 |
| | AMP-95 | Amino methyl phenol | 3.0 |
| Defoamer | Nopco NXZ | | 3.0 |
| Ethylene glycol | | | 12.0 |
| Latex | 76 RES 661 | Vinyl acetate latex | 100.0 |
| Ammonia | | | 1.0 |
| Water | | | 200.0 |
| Thickener | | | 8.0 |
| | | | 1113.5 |

The thickener composition is prepared by mixing the clay, the starch and the polymer and agitating the mixture. The mixture may be further ground to obtain fine particle size as required for each system. The thickener composition can then be used as a rheological agent in any number of water based systems. The individual components of the thickener can be added separately to a water based system or after pre-mixing of the components. The thickener may be added in the grind of the coating system or after the coating system has been prepared.

The water based systems may be prepared by any conventional method including colloid mills, roller mills, ball mills, high and low speed dispersers and various types of mixers or blenders, at room temperature, or lower or higher temperatures.

The following examples are provided to further illustrate the invention, but are not meant to limit the scope of the invention in any way.

The composition according to the present invention, comprising equal portions of spray dried hectorite, LORAMA 3030 starch and the copolymer was incorporated in the paint formulation shown in Table 1. The paint exhibits the required rheological properties as known in the art. In addition to thickening, it also provides spatter resistance, heat stability, good atomizing and water release properties. These properties are summarized in Table 2. The rheological properties were measured according to the following tests:

Stormer viscosity is measured in Krebs Units (KU) with a Stormer Viscosimeter in accordance with ASTM D562. All systems were prepared so that they have a Stormer viscosity of about 90 KU.

An ICI Cone and Plate Viscometer is used to determine the viscosity in Poise at a shear rate of 10,000 sec-1 in accordance with ASTM D-4287-83.

Sagging is the downward flow of the coating which results from gravity. Sag resistance was measured in mils with a Leneta multinotch applicator in accordance with ASTM D-4400-84, method A.

Leveling is the ability of the coating to flow into a continuous smooth surface. It is measured in accordance with ASTM D-4062-81.

Spatter resistance is the ability of the coating to remain on the substrate and not spatter around the application area. It was measured by applying the coating to a vertical surface using a standard paint roller. The speed of application was kept the same for all coating systems. The spatter falling off the roller is deposited on a black horizontal chart. Spatter resistance is compared visually and labeled as non spattering, slight, medium or poor.

Heat stability is tested by leaving the sample in an oven at 140° F. for 14 days and recording the changes in the properties of the coating systems.

the present invention are to be limited only by the terms of the appended claims.

What is claimed:

1. A rheological additive for aqueous systems consisting essentially of at least one clay, polymeric material and starch.
2. The rheological additive according to claim 1, wherein the clay is a clay selected from montmorillonite, bentonite, hectorite, kaolin, illite, saponite, attapulgite, sepiolite and mixtures thereof.
3. The rheological additive according to claim 1, wherein the starch is a starch selected from corn starch, yucca starch, barley starch, potato starch and the like, and derivatives thereof including modifications through esterification, ethoxylation, carboxylation and grafting and mixtures thereof.
4. The rheological additive according to claim 1, wherein the polymeric material is a polymer or copolymer which is the polymerization product of at least one of ethylenically unsaturated carboxylic acid monomer, modified ethylenically unsaturated carboxylic acid monomer, vinyl and modified vinyl monomer.
5. The rheological additive according to claim 1, wherein the clay is hectorite deposit or beneficiated hectorite.
6. The mixture according to claim 1, wherein the starch is corn starch.
7. The rheological additive according to claim 1, wherein the polymer is an ethylenically unsaturated carboxylic acid/vinyl acetate copolymer.
8. The rheological additive according to claim 1, wherein the clay is present in an amount of about 10% to 90% of the total thickener composition by weight.

TABLE 2

| Composition No. | Loading/ Pounds | Stormer KU | Paint Properties ICI Poise | Sag | Leveling | Spatter Resistance | Heat Stability Stormer | ICI |
|---|---|---|---|---|---|---|---|---|
| 1. SDH/STA/POL (33.3:33.3:33.3) | 9 | 90 | 1.4 | 18 | 5 | Slight | 93 | 1.1 |
| 2. SDH/SDA/POL (40:35:25) | 9 | 90 | 1.4 | 14 | 4 | Slight | 95 | 1.0 |
| 3. SDH/POL (50:50) | 8 | 90 | 1.3 | 30 | 4 | Moderate | Gelled | |
| 4. SDH/POL (75:25) | 11 | 98 | 1.4 | 16 | 3 | Moderate | 66 | 0.8 |
| 5. SDH/STA (75:25) | 10 | 78 | 1.0 | 4 | 9 | Moderate | NOT TESTED | |
| 6. SDH | 15 | 74 | 0.9 | 3 | 9 | Note a | NOT TESTED | |
| 7. STA | 22 | 72 | 1.0 | 12 | 5 | Poor | NOT TESTED | |
| 8. POL | 10 | 86 | 1.3 | 30 | 9 | Slight-Moderate | NOT TESTED | |
| 9. HEC | 7 | 95 | 2.3 | 14 | 7 | Poor | 90 | 1.3 |

SDH - Spray dried hectorite
STA - Starch (LORAMA 3030)
POL - Polymer (Rheolate 1)
HEC - hydroxyethyl cellulose (Natrosol 250 HR)
Note a: Coating would not adhere to chart.

While each component does not impart the required coating properties, the specific combination of the three components together result in improved sag resistance, spatter resistance and heat stability. A combination of the clay with the polymer (Example 4) resulted in excellent sag resistance, but moderate spatter resistance and gelled in the oven, indicating poor heat stability. The system containing hydroxy ethyl cellulose (Example 9) exhibited good viscosity, sag resistance and heat stability, but had poor spatter resistance.

Although the invention has been described and illustrated in detail, it is to be clearly understood that the same is by way of illustration and example, and is not to be taken by way of limitation. The spirit and scope of 9. The rheological additive according to claim 1, wherein the starch is present in an amount of about 10% to 90% of the total thickener composition by weight.
10. The rheological additive according to claim 1, wherein the polymer is present in an amount of about 10% to 90% of the total thickener composition by weight.
11. A water-based coating composition, comprising pigment, latex extenders and a thickener composition as defined in claim 1.
12. The water-based coating composition according to claim 11, wherein the thickener composition is present in an amount of 0.1 to 15% of the total weight of the system.

13. The water-based coating composition according to claim 11, wherein the clay is hectorite.

14. The water-based coating composition according to claim 11, wherein the starch is a starch selected from corn starch, yucca starch, barley starch, potato starch and the like, and derivatives thereof including modifications through esterification, ethoxylation, carboxylation and grafting and mixtures thereof.

15. The water-based coating composition according to claim 11, wherein the polymer is an acrylic/vinyl alcohol copolymer.

16. The rheological additive according to claim 8, wherein the clay is one of hectorite and spray-dried hectorite.

17. The rheological additive according to claim 10, wherein the polymeric material is a reaction product of methacrylic acid, methyl methacrylate and vinyl acetate.

18. The rheological additive according to claim 9, wherein the starch is one of corn starch, yucca starch, barley starch, potato starch, and derivations thereof including modifications through esterification, ethoxylation and carboxylation.

19. The rheological additive according to claim 9, wherein the starch is corn starch.

20. A thickener for aqueous systems, consisting essentially of a mixture of clay, polymeric material and starch.

21. The thickener according to claim 20, wherein the clay is a smectite clay.

22. The thickener according to claim 21, wherein the smectite clay is one of hectorite and spray-dried hectorite.

23. The thickener according to claim 20, wherein the polymeric material is a reaction product of methacrylic acid, methyl methacrylate and vinyl acetate.

24. The thickener according to claim 20, wherein the starch is one of corn starch, yucca starch, barley starch, potato starch, and derivations thereof including modifications through esterification, ethoxylation and carboxylation.

25. The thickener according to claim 20, wherein the starch is corn starch.

26. The rheological additive according to claim 1, wherein the aqueous systems are latex paints in which the at least one clay, the polymeric material and the starch provide improved roller spatter resistance characteristics.

27. The thickener according to claim 20, wherein the aqueous systems are latex paints in which the at least one clay, the polymeric material and the starch provide improved roller spatter resistance characteristics.

* * * * *